(12) United States Patent
Madsen et al.

(10) Patent No.: US 7,511,083 B2
(45) Date of Patent: Mar. 31, 2009

(54) HYDROGEL

(75) Inventors: Flemming Madsen, Klampenborg (DK); Niels Joergen Madsen, Alleroed (DK)

(73) Assignee: Coloplast A/S, Humlebaek (DK)

( * ) Notice: Subject to any disclaimer, the term of this patent is extended or adjusted under 35 U.S.C. 154(b) by 246 days.

(21) Appl. No.: 10/529,555

(22) PCT Filed: Oct. 2, 2003

(86) PCT No.: PCT/DK03/00655

§ 371 (c)(1), (2), (4) Date: Mar. 29, 2005

(87) PCT Pub. No.: WO2004/031253

PCT Pub. Date: Apr. 15, 2004

(65) Prior Publication Data

US 2006/0052478 A1    Mar. 9, 2006

(30) Foreign Application Priority Data

Oct. 2, 2002    (DK) ............................... 2002 01478

(51) Int. Cl.
C08J 3/28 (2006.01)
C08F 2/46 (2006.01)
(52) U.S. Cl. .............................. 522/24; 522/85; 522/60; 522/49
(58) Field of Classification Search .................. 522/13, 522/24, 60, 85, 49
See application file for complete search history.

(56) References Cited

U.S. PATENT DOCUMENTS

| | | | |
|---|---|---|---|
| 3,841,985 A | 10/1974 | O'Driscoll et al. | |
| 4,056,671 A * | 11/1977 | Alberts et al. | 526/342 |
| 4,189,370 A * | 2/1980 | Boschetti | 204/606 |
| 4,589,964 A * | 5/1986 | Mayhan et al. | 522/85 |
| 5,005,287 A | 4/1991 | Ritter | |
| 5,340,853 A * | 8/1994 | Chmelir et al. | 524/56 |
| 5,410,016 A | 4/1995 | Hubbell et al. | |
| 5,618,887 A * | 4/1997 | Bamford et al. | 525/279 |
| 5,643,187 A | 7/1997 | Næstoft et al. | |
| 5,844,016 A * | 12/1998 | Sawhney et al. | 522/13 |
| 5,856,370 A | 1/1999 | Chmelir | |
| 5,883,211 A * | 3/1999 | Sassi et al. | 526/307.2 |
| 6,174,950 B1 * | 1/2001 | Nzudie et al. | 524/460 |
| 6,211,261 B1 | 4/2001 | Hosokawa et al. | |
| 6,632,446 B1 * | 10/2003 | Hubbell et al. | 424/423 |
| 2001/0044482 A1 * | 11/2001 | Hu et al. | 523/106 |
| 2001/0056301 A1 | 12/2001 | Goupil et al. | |
| 2002/0045706 A1 | 4/2002 | Houston et al. | |

FOREIGN PATENT DOCUMENTS

EP    0 989 173 A1    3/2000

OTHER PUBLICATIONS

Janney, M.A., et al., "Development of Low-Toxicity Gelcasting Systems", Journal of the American Ceramic Society, 1998, vol. 81, Issue 3, pp. 581-591.
Wilmarth, W.K., et al., "Mechanisms of Oxidation by Peroxydisulfate Ion", Wiley-Interscience, 1962, pp. 175-225.
Roffey, C.G., "Photochemistry of the Peroxodisulphate Ion in Aqueous Alcohol Solutions", 1985., pp. 116-121.
Lenka, S., et al., "Studies in Photopolymerization IV: Photopolymerization of a Methyl Methacrylate . . . ", Journal of Photochemistry, 1987, pp. 365-372.
Kim, I.S., et al., "Albumin Release from Biodegradable Hydrogels Composed of Dextran . . . ," Arch Pharm Res., vol. 24, No. 1, 2001, pp. 69-73.

* cited by examiner

*Primary Examiner*—Susan W Berman
(74) *Attorney, Agent, or Firm*—Jacobson Holman PLLC

(57) ABSTRACT

A method of preparation of a cross-linked hydrogel by graft copolymerisation, said method comprises the steps of preparing an aqueous solution comprising one or more hydrophilic polymers, a cross-linking agent and a photoinitiator comprising a water-soluble peroxydisulphate, subjecting said solution to irradation and obtaining the cross-linked hydrogel, wherein the hydrophilic polymers are saturated and the cross-linking agent acts as a co-catalyst of cross-linking. The hydrogel is fast to produce and has low toxicity. The hydrogel may be suitable for use in medical devices such as dressings and the like.

11 Claims, No Drawings

HYDROGEL

This is a nationalization of PCT/DK03/000655 filed Oct. 2, 2003 and published in English.

BACKGROUND OF THE INVENTION

1. Field of the Invention

The present invention relates to a cross-linked hydrogel and the preparation a hydrogel, a solution for the preparation of a hydrogel and a hydrogel sheet.

2. Background of the Invention

Free radical, network-producing polymerisations are used in a variety of applications including coatings, information storage systems, films, and aspherical lenses and biomaterials.

Cross-linked hydrogels are commonly prepared by free radical polymerisation. Over the past three decades, a number of hydrogels differing in structure, composition, and properties have been developed. Hydrogels are insoluble, water-swollen networks composed of hydrophilic homo-or copolymers. They are desirable for biomedical applications because of their high water content and rubbery nature, similar to natural tissue.

Free radical polymerisation processes are initiated by free radical initiators to obtain ensure proper polymerisation rates. These free radical initiators are activated by irradiation e.g. in the form of E-beam, microwaves, gamma or light (which includes UV, visible or near infrared). Other methods of initiating free radical polymerisation are thermal initiation and redox initiation.

While all initiation methods have their advantages/disadvantages the use of photopolymerisation is recognized as a fast, convenient and controllable way of preparing hydrogels through free radical polymerisation. The polymerisation process can be carried out under ambient or physiological conditions and even in the presence of biologically active materials. There are other advantages of using the photopolymerisation technique for biomaterials. In general, the process is benign and the process may also proceed rapidly at ambient conditions for most monomers and conventional initiators, i.e. fast curing rates. In addition, the ability to direct exposure of for example UV light and time of incidence to achieve spatial and temporal control is particularly advantageous for the formation of complex devices.

Due to their biocompatibility, permeability, and physical characteristics, hydrogels are suitable for use in many medical applications, including tissue engineering. Hydrogels may be useful for manipulation of tissue function or for scaffolds for tissue regeneration or replacement. The use of photopolymerisation in the preparation of hydrogels is advantageous in comparison with conventional cross-linking methods because liquid hydrogels precursors can be delivered and cross-linked to form hydrogels in situ in a minimally invasive manner. This process also renders it possible to achieve spatial and temporal control over the conversion of a liquid to a gel, so that complex shapes can be fabricated. Hydrogels can be formed with varying polymer formulations in three-dimensional patterns since sequentially polymerised layers will firmly adhere to one another.

Photopolymerised hydrogels can be designed to degrade via hydrolytic or enzymatic processes and can be modified with biofunctional moieties within their structure to manipulate cell behaviour and to generate organ-specific tissue formation. These photopolymerisable hydrogels can be used as barriers, localized drug delivery depots, cell encapsulation materials, and scaffold materials. Other biomedical applications include the prevention of thrombosis, post-operative adhesion formation, drug delivery, coatings for biosensors, guide-wires and catheters, and for cell transplantation.

Visible or UV light can interact with light sensitive compounds called photo-initiators to create free radicals that can initiate polymerisation to form cross-linked hydrogel (3-D polymeric networks). In vivo this principle has been utilized to polymerise or cure materials in dentistry to form sealant and dental restorations in situ. Photopolymerisations has also been used in electronic materials, printing materials, optical materials, membranes, polymeric materials, and coatings and surface modifications.

Photopolymerisation has several advantages over conventional polymerisation techniques. These include spatial and temporal control over polymerisation, faster curing rates (less than a second to a few minutes) at room or physiological temperature, and minimal heat production. Furthermore, photopolymerisation can be utilized to create hydrogels in situ from aqueous precursors in a minimal invasive manner. Fabrication of polymers in situ is attractive for a variety of biomedical applications because this allows one to form complex shapes that adhere and conform to tissue structures, for example laparascopic devices, catheters, or subcutaneous injection with trans-dermal illumination.

Polymerisation conditions for in vivo applications are however difficult since biological systems require a narrow range of acceptable temperatures and pH, as well as absence of toxic materials such as monomers and organic solvents is demanded. Some photopolymerisations systems may overcome these limitations because the polymerisation conditions are sufficiently mild (low light intensity, short irradiation time, physiological temperature, and low organic solvent levels) to be carried out in the presence of cells and tissues.

Photopolymerisation schemes generally use a photoinitiator that has a high absorption at a specific wavelength of light to produce radical initiating species. Other factors that should be considered include its biocompatibility, solubility in water, stability, and cytotoxicity. Various photoinitiators have been investigated to achieve better photopolymerisation. Photoinitiation is classified in three major classes depending on the mechanism involved in photolysis. The classes are radical photopolymerisation trough 1) photo-cleavage, 2) hydrogen abstraction and 3) cationic photopolymerisation. Cationic photoinitiators are generally not utilized in tissue engineering applications because they generate protonic acids and toxic side products. Cationic photopolymerisation will not be discussed further here.

In radical photopolymerisation by photocleavage, the photoinitiators undergo cleavage at C—C, C—Cl, C—O, or C—S bonds to form radicals when exposed to light. Water-soluble photoinitiators include aromatic carbonyl compounds such as benzoin derivatives, benziketals, acetophenone derivatives, and hydroxyalkylphenones. Acetophenone derivatives that contain pendant acrylic groups have been shown to substantially reduce the amount of unreacted photoinitiator with no significant loss in the initiation efficiency. Acetophenone derivatives, such as, 2,2-dimethoxy-2-phenyl acetophenone, have been used as photoinitiators to form hydrogels from acrylated polyethylene glycol (PEG) derivatives in several biomaterial studies.

Radical photopolymerisation by hydrogen abstraction: When subjected to UV irradiation, photoinitiators such as aromatic ketones (i.e., benzophenone and thioxanthone) undergo hydrogen abstraction from an H-donor molecule to generate a ketyl radical and a donor radical. The initiation of photopolymerisation usually occurs through the H-donor radical while the ketyl radical undergoes radical coupling with the growing macromolecular chains. The photoinitiator propyl thixanthone has been shown to be cytocompatible.

Effective photoinitiators are for example compounds such as benzophenone, acetophenone, fluorenone, benzaldehyde, propiophenone, anthraquinone, carbazol, 3 or 4-methylacetophenone, 3 or 4-methoxybenzophenone, 4,4'-dimethoxybenzophenone, allylacetophenone, 2,2'-diphenoxyacetophenone, benzoin, methylbenzoin ether, ethylbenzoin ether, propylbenzoin ether, benzoin acetate, benzoinphenyl carbamate, benzoin acrylate, benzoinphenyl ether, benzoyl peroxide, dicumyl peroxide, azo isobutyronitrile, phenyl disulphide, acyl phosphene oxide or chloromethyl anthraquinone as well as mixtures thereof.

Peroxy—compounds, i.e. compounds containing an —O— binding, where oxygen has the oxidation number −1 are known as strong oxidation agents. They are capable of producing free radicals in many environments. As such peroxy-compounds have been utilized in free radical polymerisations as initiators of various kind, i.e. thermal, photo or redox initiation.

Persulphate (peroxydisulphate) is well known as an initiator of vinyl polymerisation in aqueous systems. Often used as a thermal initiator, where thermal decomposition produces radical ions, which directly or indirectly cause chain propagation. Peroxides may also be used as photoinitiators of vinyl polymerisation processes; both hydrogen peroxide, peroxydisulphate and peroxydiphosphate have been utilized for this purpose. The reaction scheme for the initiation of peroxydisulphates by photodecomposition is similar to that of thermal initiation. From the reaction scheme it is evident that the sulphate or hydroxyl radicals or a combination thereof may initiate polymerisation.

The peroxydisulphate is decomposed into sulphate ion radicals. These radicals are capable of reacting with a macromer or monomer unit (denoted M) to create a macromer or monomer radical. Furthermore the sulphate ion radical is capable of hydrogen abstraction from water thus creating hydroxyl radicals, which may react with a macromer or monomer unit creating another macromer or monomer radical.

$S_2O_8^- + (\Delta \text{OR h}\nu) \rightarrow 2SO_4^{\bullet-}$

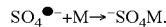
$SO_4^{\bullet-} + M \rightarrow {}^-SO_4M.$

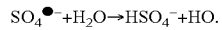
$SO_4^{\bullet-} + H_2O \rightarrow HSO_4^- + HO.$

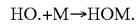
$HO. + M \rightarrow HOM.$

It is also well known that decomposition can be induced by the addition of reducing agents such as ferrous ions:

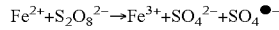
$Fe^{2+} + S_2O_8^{2-} \rightarrow Fe^{3+} + SO_4^{2-} + SO_4^{\bullet-}$ Peroxydisulphates have commonly also been employed in irradiation polymerisation processes where irradiation with γ rays are used. Another process concerned with the chemistry of peroxides has proven useful in free radical polymerisation, namely the photo-Fenton reaction. The photo-Fenton reaction has been largely applied in oxidative degradation of organic pollutants for water treatment and in some special cases depolymerisation technique. The photo-Fenton reaction has also been described to produce polymers from vinylpyrrolidone (VP) and copolymers hereof (copolymers of VP and MAA (methacrylic acid).

The photo-Fenton reaction is a process comprising two-interconnected steps. Firstly, hydrogen peroxide is decomposed into hydroxyl radicals by the presence of $Fe^{2+}$, which is oxidized to $Fe^{3+}$. In the dark the reaction is retarded after complete conversion of $Fe^{2+}$ to $Fe^{3+}$. Irradiation of the system by UV-light (around 365 nm) results in photoreduction of $Fe^{3+}$ to $Fe^{2+}$, which produce new hydroxyl radicals with hydrogen peroxide according to the first process or to an additional effect of direct peroxide photolysis. In the above mentioned polymerisation process practically no polymerisation occurred without light. Hence, to create a high enough concentration of hydroxyl radicals to initiate chain propagation, light is necessary.

It is believed, that any free radical initiation system, especially free radical polymerisations carried out in aqueous solutions capable of generating soluble peroxides may be greatly enhanced by the addition of soluble metal ions capable of initiating the decomposition of the formed peroxides (redox process). These metal ions include iron and other transition metals having at least to readily available oxidation states.

Polymerisation of monomers using visible or UV irradiation has been thoroughly investigated. While such systems may work well for many applications including many biomaterials, they generally cannot be utilized in tissue engineering because most monomers are cytotoxic. As a result, photopolymerisable hydrogels for tissue engineering have generally been formed from macromolecular hydrogel precursors. Such precursors are water-soluble polymers with two or more reactive groups. Examples of photopolymerisable macromers include PEG acrylate derivatives, PEG methacrylates derivatives.

Poly(ethylene glycol) is a non-toxic, water soluble polymer which resists recognition by the immune system. The term PEG is often used to refer to polymer chains with molecular weights below 20.000, while poly(ethylene oxide) (PEO) refers to higher molecular weight polymers. PEG may transfer its properties to another molecule when it is covalently bound to said molecule. This may result in toxic molecules becoming non-toxic (as is the case with PEG-DMA which is non-toxic pegylated dimethacrylic acid) or hydrophobic molecules becoming soluble when coupled to PEG. It exhibits rapid clearance from the body, and has been approved for a wide range of biomedical applications. Because of the properties, hydrogels prepared from PEG are excellent candidates as biomaterials.

Polyvinyl alcohol (PVA) derivatives, and modified polysaccharides such as hyaluronic acid derivatives and dextran methacrylate have been described as useful macromolecular precursors.

Polyvinylpyrrolidone (PVP) is another useful candidate. Polymeric materials based on poly(N-vinyl-2-pyrrolidone) (PVP) and its copolymers have found intense applications as hydrogels and membranes used in drug delivery systems, adhesive formulations, and in photographic and lithographic coatings. The low chemical toxicity of PVP, its solubility in water and in organic solvents as well as its ability to complex with many kind of substrates like dyes, surfactants, and other polymers, have promoted its use as a protective colloid in pharmaceutical and cosmetic products.

3. Description of the Related Art

U.S. Pat. No. 5,410,016 discloses the development of photopolymerisable biodegradable hydrogels. The hydrogel comprises a macromer on which is grafted biodegradable units such as poly(alpha-hydroxy acid), poly(glycolic acid), poly(DL-lactic acid) and poly(L-lactic acid). Other useful materials includes poly(amino acids), poly(anhydrides), poly (orthoester), poly(phosphazines) or poly(phosphoester). Polylactones like poly(ε-caprolactone), poly(δ-valerolactone) or poly(λ-butyrolactone).

PVP is mentioned as a possible water-soluble region of the macromer. Acrylates, diacrylates, oligoacrylates, methacrylates, dimethacrylates, oligomethacrylates are mentioned as polymerisable regions of the macromer. The macromers are synthesized in organic solvents and photosensitive macromers prepared from these macromers. A combination of PEG-DMA and PVP is mentioned, the photoinitiators employed are commonly known. Peroxydisulphates may alternatively be used as thermal initiators.

U.S. patent application No. 2001/0044482 discloses interpenetrating polymer network (IPN) compositions and a process for the manufacturing of hydrogel contact lenses. The polymeric material is prepared by polymerisation of an unsaturated alkyl(meth)acrylate or its derivatives such as 2-hydroxyethyl methacrylate (HEMA) as the principle monomer, optionally vinyl containing comonomer(s) to enhance the resulting water absorbing capability, polymerisable multifunctional cross-linking agent(s), an irradiation initiator and/or thermal initiator, optionally other additives to impart the resulting hydrogel specific properties such as UV-blocking ability and handling colorants; in the presence of a soluble hydrophilic interpenetrating networking agent such as polyvinyl-pyrrolidone or poly-2-ethyl-2-oxazoline (PEOX) with a specific molecular weight. PVP is mentioned as IPN agent, PEG-DMA is mentioned as a cross-linker and photoinitiation or/and thermal polymerisation is mentioned. UV or thermal initiation is used alone or in combination.

The hydrogels are prepared by mixing all the ingredients (dissolved in each other), subjecting the mixture to a short UV curing (minutes) followed by a longer thermal post curing (hours). The obtained dry gel is then hydrated after curing. The method of preparation is used in order to obtain a thorough curing process to secure that all monomers have been consumed in the curing process. The curing process is quite time consuming.

U.S. Pat. No. 5,005,287 discloses a process for forming and applying a hydrophilic coating cured by UV-light to a plastic or metal part either directly, or indirectly via plastic film, to safety razor or razor blade unit. The coating comprises a water-soluble polymer or copolymer of PVP, at least one radically polymerisable vinyl monomer and a photoinitiator. Several vinylic monomers, mostly of the type acrylic acid or methacrylic acids are mentioned. Oligoethylene glycol bisacrylate is mentioned as a suitable cross-linker. A wide range of photoinitiators is mentioned. Water is mentioned as a polymerisation solvent. The cured polymer layers are of 5-1000 µm thickness. Curing times are in seconds to minutes.

W. K. Wilmarth and A. Haim in J. O. Edwards (ed.), Peroxide reaction mechanisms, Wiley-Interscience, New York, 1962, pp. 175-225, discloses the reactions of peroxidisulphate with various substrates in aqueous solution from a mechanistic viewpoint. The thermal and photolytic decompositions of the peroxidisulphate ion are described in detail.

C. G. Roffey in JOCCA 1985 (5), 116-120, discloses the photodecomposition of the peroxydisulphate ion in water or water/ethanol mixtures producing sulphate ion radicals, which are potentially useful in various emulsion polymerisation techniques.

S. Lenka and P. L. Nayak in Journal of Photochemistry, 1987, 36, 365-372, disclose the use of peroxydiphosphate to photopolymerise methyl methacrylate.

In-Sook Kim et al, in Arch. Pharm. Res. 2001, 24, No. 1 69-73 discloses the use of ammonium peroxydisulphate and UV light in vinylic radical polymerisation of a biodegradable hydrogel formed from a functionalised dextran (glycidyl methacrylate dextran and dimethacrylate poly(ethylene glycol). The photopolymerisation process is carried out with a rather high amount of ammonium persulphate (10% of polymer weight) and a very long UV-curing time of 80 minutes.

Thus, there is still a need for a hydrogel, which can be produced in a fast and simple manner, being non-toxic and producible in both thin and thick layers. Surprisingly, such a hydrogel has been achieved by the present invention.

SUMMARY OF THE INVENTION

It is the first object of the invention to prepare a cross-linked hydrogel in a fast and simple manner.

It is another object of the invention to prepare a non-toxic hydrogel.

It is further an object of the invention to prepare a hydrogel of various shapes and thickness.

The present invention relates to a cross-linked hydrogel, the preparation of such hydrogel, a stock solution for preparing a hydrogel and a hydrogel sheet material.

DETAILED DESCRIPTION OF THE PRESENT INVENTION

The invention relates to a method of preparation of a cross-linked hydrogel by graft copolymerisation, said method comprises the steps of preparing an aqueous solution comprising one or more hydrophilic polymers, a cross-linking agent and a photoinitiator comprising a water-soluble peroxydisulphate, subjecting said solution to irradiation and obtaining the cross-linked hydrogel, wherein the hydrophilic polymers are saturated and the cross-linking agent acts as a co-catalyst of cross-linking.

The peroxidisulphate may preferably be sodium, potassium or ammonium peroxydisulphate.

The invention further relates to a composition for preparation of a cross-linked hydrogel by graft copolymerisation, said composition comprises an aqueous solution comprising one or more hydrophilic polymers, a cross-linking agent and a photoinitiator comprising a peroxysulphate, wherein the hydrophilic polymers are saturated and the cross-linking agent acts as a co-catalyst of cross-linking.

The invention relates to a method for preparing a hydrogel (a three dimensional cross-linked hydrophilic copolymer network) in a fast, efficient photo-curing method. This is obtained using photo-polymerisation in aqueous solution through combined graft copolymerisation and cross-linking employing photopolymerisable water soluble hydrophilic saturated polymers and cross-linking agents as hydrogel precursors and water soluble peroxy compounds as photoinitiators alone or in combination with co-initiators (such as photo-Fenton like catalysis). The resulting hydrogel network is a water containing grafted and cross-linked polymer network.

The chemistry of the photodecomposition of peroxidisulphate is well described in literature and the utilization of this initiating reaction in free radical polymerisations has been disclosed. The use of peroxidisulphate as an photoinitiator has primarily been for vinyl polymerisation processes, i.e. for initiating free radical polymerisations from unsaturated monomers, i.e. monomers containing vinylic or acrylic groups, such groups reacting willingly with the initiating sulphate ion radicals creating new propagating radicals.

Surprisingly, it has in the present invention been found that hydrophilic saturated polymers in aqueous solution, i.e. polymers containing no available (free) vinyl or acrylic groups, can be activated by the photodecomposition of peroxidisulphate leading to the creation of free polymer radicals through hydrogen abstraction which in turn leads to a cross-linked hydrogel by a grafting process. The cross-linking is in turn a combination of polymer radicals combining with each other and polymer radicals initiating a graft copolymerisation with the cross-linking agent, both forming a cross-linked network.

The main polymerisation process may be described as follows: When subjected to UV irradiation, a peroxy-containing compound such as peroxydisulphate, the resulting sulphate ion radical is capable of either hydrogen abstraction from the saturated hydrophilic polymer present in solution or creating a cross-linking agent radical. It may also terminate by reacting with other free radicals. The polymer radicals can combine with each other or initiate a graft copolymerisation by combining with cross-linking agent radicals. The overall cross-linking is a mix of cross-links between polymer-polymer, polymer and grafted polymer and polymer-cross linking agent. The main contribution of cross-links will be from polymer-polymer cross-links. The end result is a hydrogel consisting of grafted cross-linked polymer network containing water.

The curing efficiency of the system presented is beyond what would be expected using the described amounts of cross-linking agent and photoinitiator. While it is quite possible to cross-link a hydrophilic saturated polymer itself like PVP using large amounts of photoinitiator and a heavy dose of heat or irradiation, it is surprising to find a curing speed, curing effienciency and resulting gel strength as high as presented from the compositions employed in the present invention. Theoretically, in the present invention, the cross-linking agent itself could be incorporated into the polymeric network contributing to the overall curing efficiency. However, the double bond density defined by the amount of cross-linking agent employed and thus defining the final cross-linking density is much to small to explain the resulting curing speed, efficiency and gel strength.

The curing efficiency of the present method may be subscribed to a preferred combination of peroxydisulphate acting as the photoinitiator and the cross-linking agent having a dual function, namely both being a cross-linker itself and acting as co-catalysator of cross-linking. Thus, obtaining the grafted cross-linked hydrogel requires apart from the hydrophilic saturated polymer in solution only the presence of a catalytic amount of an unsaturated cross-linking agent and small amount of photoinitiator (peroxidisulphate).

Still further, the photopolymerisation method offers a safe and convenient way of preparing a cross-linked hydrogel by simply mixing the constituents and curing the solution in a free radical bulk solution photopolymerisation process under ambient conditions. The hydrogel according to the invention may be prepared in industrial scale via a simple in-line process or it may be prepared in situ under physiological conditions (in vivo or in vitro). The use of the photopolymerisation method according to the invention allows hydrogels to be prepared both in stock rolls and in complex shapes using moulding. Due to the photopolymerisation technique employed in this invention it is possible to obtain deep curing of polymer solutions obtaining hydrogels of various thickness from very thin ($\mu$m) to very thick layers (several centimeters). Hydrogels with a broad range of properties including a varying degree of adhesiveness may be prepared.

The hydrogel of the invention may preferably be prepared as sheets or coatings, in a continuous process or in bulk production. The sheet may have any suitable thickness such as from 10 $\mu$m to 2 cm.

In one embodiment of the invention the hydrogel is casted in a mold to obtain a three-dimensional configuration.

Hence, the hydrogel according to the present invention may be prepared for a vast number of various fields such as wound dressings, controlled release (drug delivery) devices including transdermal drug delivery devices, cosmetics, biosensors or electrodes, coatings or membranes. Included are hydrogels as skin adhesives and protectants for instance for ostomy and continence care.

The method according to the invention allows the preparation of a non-toxic and biocompatible hydrogel through the use of safe and non-toxic constituents. The resulting hydrogel has due to the nature of the method of preparation, i.e. the efficiency of the photoinitiating system, the employment of macromolecular hydrogel precursors and catalytic amounts of cross-linking agent and photoinitiator, a very low content of residuals and may be used for biological or medical purposes without the need of drying, washing and rehydration to remove any undesired content of residuals as is necessary and common practice when polymerising from monomers which often are toxic.

A preferred embodiment of the invention relates to a cross-linked hydrophilic polymer network system, said hydrogel comprising a hydrophilic water-soluble polymer PVP or copolymers of PVP, grafted and cross-linked with a suitable cross-linking agent.

The hydrogel is prepared in aqueous solution through a free radical bulk solution polymerisation using photopolymerisation with wavelengths from 190-1000 nm, preferably 200-700 nm. The polymerisation is brought about by the decomposition of a water-soluble photoinitiator into free radicals, which directly or indirectly cause chain propagation and cross-linking. The critical property of the photoinitiating system is that the polymerisation will not proceed at a useful rate without the presence of the initiator.

The photocuring method disclosed in the present invention is surprisingly fast and efficient. The hydrophilic saturated polymers, the cross-linking agent and the photoinitiator are mixed in an aqueous solvent and cured by light obtaining a water containing a grafted and cross-linked hydrogel system. The curing is rapid in the range of seconds to minutes depending of the desired thickness of the hydrogel. Deep complete curing can be obtained allowing very thick layers (several centimeters) of hydrogel to be prepared.

The method of the present invention is superior to common photopolymerisation processes due the capability of a very effective deep curing ($\mu$m—several centimeters) in a short period of time (seconds to minutes) in solutions containing from a very low to a very high amount of water. The photocuring may be carried out in air under ambient temperature and pressure.

UV initiated photopolymerisations are often slow in air compared to in an inert atmosphere. However, the photopolymerisation process according to the invention is seemingly not impaired by the presence of oxygen. Oxygen, which often inhibits free radical reactions, which inhibit propagation, does surprisingly not slow down the polymerisation process in the in method according to the invention to any critical extent and the insensibility to oxygen contributes to an efficient curing. The time required for gelation is short (seconds to minutes depending on thickness). This is very significant. No significant difference in the polymerisation rates and the physical/mechanical properties of the hydrogel is observed in hydrogels produced in air compared to hydrogels prepared in an inert atmosphere created by purging the solutions with nitrogen. However, to minimize the effect of any created peroxides due to dissolved oxygen in the aqueous solutions, which potentially could influence the stability of the resulting hydrogel, $Fe^{2+}$ may be added alone or in combination with one or more antioxidants like ascorbic acid to enhance the free radical initiating system.

Further distinctions from other systems using UV-curing free radical polymerisation and peroxydisulphates and/or the ferrous co-initiator system may be made. For example it should be noted that it is not possible to obtain a strong gel network in the following cases:

a) By thermal initiation, i.e. introducing the aqueous solution to heat (80° C.) in the same time span as in which the aqueous solutions is irradiated with UV-light. A thermal initiated gelation with peroxydisulphate would usually have a time span of hours, b) by decomposition of the peroxydisulphate with a ferrous ion into sulphate radicals. The presence of a reducing agent like the ferrous ion ($Fe^{2+}$) or a redox pair like ascorbic acid and $Fe^{2+}$ together with peroxydisulphate is not enough to create a useful and satisfying hydrogel network. It is necessary to irradiate the polymer solution with light simultaneously to obtain a strong cross-linked hydrogel, c) by leaving out the cross-linking agent. Peroxydisulphate cross-linked PVP gels have been described using either thermal initiated polymerisation or irradiation ($\gamma$ rays). Furthermore, it has been described that aqueous PVP solutions could be directly cross-linked by irradiation with $\gamma$ rays. In the present method no curing is seen when either PEG-DMA or peroxydisulphate or both are left out of the solution. Both are necessary for the formation of strong but soft hydrogel material.

When replacing the peroxydisulphates with other commonly used water-soluble photoinitiators and curing under identical conditions only a partly (surface) cured hydrogel may be obtained.

The hydrophilic saturated polymers may be selected from the group of cellulose derivatives, polysaccharides, polyvinyl-pyrrolidone, polyvinyl alcohol, polyacrylic acid, poly(m-ethyl vinyl ether/maleic anhydride), poly(meth)acrylic acid, polethylenglycols (PEG), polyamides, polyacrylic amides, polyethylene glycol (PEG) or copolymers or blends of these.

A primary issue for the hydrophilic polymer is toxicity and water solubility. For all biologically related uses toxicity must be low or absent in the finished hydrogel. Thus, the hydrophilic polymers should not be harmful and should be non-toxic. Choosing a hydrophilic saturated polymer from the above list ensures that the entry level of unwanted or toxic residuals are kept very low.

In a preferred embodiment of the invention the hydrophilic polymers comprise polyvinyl pyrrolidone (PVP) or PVP based copolymers.

The principle hydrophilic polymer is preferably polyvinyl pyrrolidone (PVP) or PVP based copolymers in order to obtain a hydrophilic, water-soluble polymer backbone. The amount of polymer used is preferably in the range 1-90% w/w more preferred in the range of 5-50% w/w, depending on the water content and other desired properties of the resulting hydrogel.

The cross-linking agent may comprise vinylic or unsaturated macromers or monomers such as mono-/di- or multifunctional acrylates or methacrylates.

The term "cross-linking agent" is used herein in a broad sense in that it is a composition, which is capable of being grafted to the polymeric backbone and ensuring cross-linking of the polymeric backbone, either by solely catalysing a cross-linking reaction between the hydrophilic polymer chains or by becoming a part of the resulting polymeric network.

Typically, the cross-linkers are di- or multifunctional compounds that can incorporate themselves into the resulting polymer backbone during the polymerisation process. The cross-linking agent may comprise vinylic or unsaturated macromers or monomers.

The concentration of the cross-linking agent is chosen according to the required degree of cross-linking, and consequently it is determined not only by the amount of the cross-linking agent but also by the type and ability to form the cross-linked polymer. The less effective cross-linking agents have to be applied in a higher concentration than the more effective ones. While the cross-linker in principle could be added in very high concentrations up to approximately 80% w/w of polymer weight, preferably, the cross-linking agents may be present in an amount of 1- to 30% w/w of polymer weight, more preferred 1-25% w/w, even more preferred 1-20% w/w, and most preferred 1-15% w/w In one embodiment of the invention the cross-linking agent is present in an amount of up 1-10% w/w of polymer weight.

When referring to the cross-linking agent as a co-catalysator of cross-linking, it should be perceived that the concentrations in question are fairly low concentrations as the double bond density in solution and thus the cross-linking density of the cross-linking agent itself in the resulting polymer network would be low. Too low to explain the curing efficiency of the method presented in the invention. This is accordance with the principle that the cross-linking agent primarily acts as a co-catalysator of the cross-linking process as much as being a cross-linker itself.

The cross-linking agent may include, but are not being limited to, cyclic or open-chain ether groups, such as esters of single or multiple ethoxylated or propoxylated $C_1$-$C_{20}$ alcohols, tetrahydrofuran ("THF") carbinol acrylate or THF carbinol methacrylate, hydroxyalkyl esters, such as 2-hydroxyethyl acrylate, 2-hydroxyethyl methacrylate, 2-hydroxypropyl acrylate or 2-hydroxypropyl methacrylate, N,N-dimethylamino-2-hydroxyethyl acrylate, N,N-dimethylamino-2-hydroxyethyl acrylate, N,N-dimethylaminoethyl methacrylate or salts thereof, such as N,N,N-trimethylammonium-2-ethyl methacrylate chloride, also acrylamide, N-alkylacrylamide with 1-10 C atoms in the alkyl group, N-2-hydroxyethyl acrylamide, N-2-hydroxypropyl acrylamide or methacrylamide, N-2-hydroxyethyl methacrylamide, N-2-hydroxypropyl methacrylamide, acrylonitrile and methacrylonitrile.

Suitable di- or multifunctional cross-linking agents may be, but not being limited to ethylene glycol dimethacrylate, triethylene glycol dimethacrylate, tetraethylene glycol dimethacrylate, trimethylopropane trimethacrylate, bisphenol A dimethacrylate, ethoxylate bisphenol A dimethacrylate, pentaerythritol tri- and tetrametacrylate, tetramethylene dimethacrylate, methylenebisacrylamide, methacryloxyethyl vinyl carbonate, triallylcyanurate, methacryloxyethyl vinyl urea, divinyl benzene, diallyl itaconate, allyl methacrylate, diallyl phtalate, polysiloxanylbisalkyl methacrylate and polyethylene glycol dimethacrylate.

Oligo- or macromeric structures of a non-toxic nature are preferred. Of these, PEG containing di- or multifunctional oligo-or macromers may be of special interest. In the present invention, polyethylene glycol dimethacrylate of an approximately molecular weight of 400 (PEG-DMA 400) and an approximately molecular weight of 1000 (PEG-DMA 1000) may be preferred as cross-linking agent.

In a preferred embodiment of the invention the photoinitiator comprises water-soluble inorganic peroxydisulphates, such as sodium, potassium or ammonium peroxydisulphate.

The solution may further comprise one or more co-initiators. The co-initiator may be in the form of transition metal ions.

Metal ions suitable for use as co-initiators may be any of the transition metal ions, having at least two readily oxidation states. These include but are not being limited to ferric/ferrous, cupric/cuprous, ceric/cerous, cobaltic/cobaltous, vanadate(V)/vanadate(IV), permanganate and manganic/manganous.

Surprisingly, it is possible to obtain the fast and deep efficient curing of the described polymer system by photodecomposition by UV-light using an initiator, i.e. a water-soluble inorganic peroxydisulphate, which may have been disclosed, as a thermal, redox or photoinitiator but has not been utilized in a context similar to the invented method presented here. It is as such in small amounts a very efficient photoinitiator for the graft copolymerisation and cross-linking of a hydrophilic saturated polymer system in presence of catalytic amounts of a cross-linking agent. The curing can be further enhanced by using the photoinitiator in combination with a ferrous co-initiator system (photo-Fenton like), which will enhance the initiation process by creating more free radicals initiation species.

The photoinitiators may be water-soluble peroxy-group containing compounds, preferably, but not being limited to the inorganic peroxydisulphates, such as sodium, potassium or ammonium peroxydisulphate, used alone or in combination with a co-initiator preferably $Fe^{2+}$. The peroxydisulphates are photodecomposed to sulphate radicals, which radicals initiate the cross-linking process by creating PVP-polymer radicals through hydrogen abstraction and PEG-DMA radicals via the vinylic groups of dimethacrylate. Photoinitiators may be used in the polymer mixture in an effective quantity from 0.1 to 5% w/w, in particular 0.5 to 5% w/w.

To further speed up the process and add to the efficiency, the addition of a co-initiator like $Fe^{2+}$ may give a higher initial concentration of free radicals. $Fe^{2+}$ reduces peroxydisulphate into a sulphate ion and a sulphate radical ion. $Fe^{3+}$ is converted back to $Fe^{2+}$ by photoreduction of the UV-light and $Fe^{2+}$ is now further available for radical formation with peroxydisulphate. The utilization of this photo-Fenton like system serves dual purposes. Firstly, it creates the maximum amount of free radicals in a positive feedback loop as there is both acting a photodecomposition of peroxydisulphate into sulphate radicals (and hydroxyl radicals in water) while simultaneously $Fe^{2+}$ reduces peroxydisulphate into a sulphate ion and a sulphate radical ion. The photo conversion of $Fe^{3+}$ back to $Fe^{2+}$ ensures that any excess of peroxydisulphate will be converted into radicals.

Secondly, the stability of the hydrogel may be further improved by the addition of $Fe^{2+}$ and the photo-Fenton like reaction scheme, since $Fe^{2+}$ may initiate the decomposition of undesired peroxides which could be formed during the polymerisation process and which possibly could impair hydrogel stability.

As the present invention is based on photocuring in an aqueous environment a water-soluble photoinitiating system is preferred. However, any compound, which disintegrates into radicals when subjected to radiation, may be used. A primary concern of choice is the toxic profile of the photoinitiator.

The photoinitiator system in the present invention may in principle be used in combination with known water-soluble photoinitiators such as benzophenone, acetophenone, fluorenone, benzaldehyde, propiophenone, anthraquinone, carbazol, 3 or 4-methylacetophenone, 3 or 4-methoxybenzophenone, 4,4'-dimethoxybenzophenone, allylacetophenone, 2,2'-diphenoxyacetophenone, benzoin, methylbenzoin ether, ethylbenzoin ether, propylbenzoin ether, benzoin acetate, benzoinphenyl carbamate, benzoin acrylate, benzoinphenyl ether, benzoyl peroxide, dicumyl peroxide, azo isobutyronitrile, phenyl disulphide, acyl phosphene oxide or chloromethyl anthraquinone as well as mixtures thereof.

Co-catalysts such as amines, for example triethanolamine, as well as other trialyl amines of trialkylol amines could be added. In principle, any compound typically used in photoinitiation as radical generators or co-catalysts may be used. Sulphur compounds, heterocycles, for example, imidazole, enolates, organo-metallics and other compounds, such as N-phenyl glycine.

Additionally, comonomers could be added to change the polymerisation process or the final properties of the hydrogel of the invention. These comonomers include sulphoxide containing methacrylate, polyethylene glycol (400) ether monomethacrylate and glycerol monomethacrylate. Also of interest are N-vinyl compounds, including N-vinylpyrrolidone, N-vinyl acetamide, N-vinyl imidazole, N-vinyl caprolactam and N-vinyl formamide. A primary concern when including a cocatalyst or a comonomer is the toxicity in the resulting hydrogel system.

The solvent of choice for the preparation of the cross-linked hydrogel in the present invention is water or buffered aqueous solutions. However, any solvent, which may have a favourable effect on the photopolymerisation process or the working properties of the hydrogel system may be employed. Suitable solvents may be acetone, methyl ethyl ketone, methanol, ethanol, propanol, butanol, ethyl acetate, butyl acetate, methylene chloride, toluol, THF, water and mixtures thereof. Again, the concern of any potential residual solvent toxicity in the finished hydrogel is determining the choice of co-solvent. Water is preferred as solvent due to the non-toxic properties, as well as no washing or extraction of any toxic solvent from the resulting hydrogel may be needed, when water is employed.

In one embodiment of the invention the hydrogel comprises one or more plasticizers, preferably polyols. The plasticizers include, but are not being limited to polyols like glycerol, propylene glycol and polyethylene glycols of various chain lengths.

The hydrogels may be prepared with a range of additives to obtain special chemical or physical characteristics. Surfactants may be added for stabilization purposes.

Polymeric material may be added for viscosity improvement of the polymer solutions: Cellulose derivatives, like methyl cellulose, hydroxymethylcellulose, hydroxypropyl cellulose, ethyl cellulose, sodium carboxymethyl cellulose, other polysaccharides like but not being limited to acacia gum, trachagant, alginate, carrageenan, xanthan, locust bean gum, chitosan, starch derivatives like carboxymethyl-starch or dextran.

Synthetic polymers which introduces complexation with the principle polymers in the present invention may also be utilized to alter the photocuring polymer solutions and include but are not being limited to polyacrylates and polymethacrylates. Solubilizers like cyclodextrins may also be added.

The gels may be provided with a supporting net or reinforcing layer. The reinforcing layer may ease the handling of the hydrogel as well as the strength of the gel is enhanced. The reinforcing layer may be in the form of a web or a net, or a non woven material such as polyester, polyamide polyethyl or polypropyl, fibres, woven fabrics such as gauze, or foils or films with an open space structure or the like. The reinforcing layer may be incorporated in the hydrogel, or the hydrogel may be laminated or casted onto the net.

The hydrogel may be provided with a backing layer. The backing layer may be totally occlusive, liquid impervious but vapour permeable or it may be of a type having higher water permeability when in contact with liquid water than when not in contact. The backing layer may be of any suitable material known per se for use in the preparation of medical devices e.g. a foam, a non-woven or a polyurethane, polyethylene, polyester or polyamide film.

A suitable material for use as a backing layer is a polyurethane. A preferred low friction film material is disclosed in U.S. Pat. No. 5,643,187.

In one embodiment of the invention the hydrogel of the present invention is conductive. This is obtained by adding electrolytes like various kinds of inorganic salts or other conductive compounds.

The hydrogel according to the invention may comprise one or more active ingredients.

The hydrogel according to the invention may comprise one or more active ingredients, e.g. pharmaceutically active compounds.

The compounds may be immobilized on or within the hydrogel. Numerous techniques exist including physical entrapment, electrostatic attraction, physical adsorption or absorption and chemical bonding may be utilized. The active compound may be entrapped by conducting the photopolymerisation of the polymer solutions in the presence of the active compound. Alternatively, the active agent could be introduced after curing by imbibition. In imbibition, the previously prepared hydrogel is placed in a solution containing the solute for an extended period of time. Eventually, the solute diffuses into the hydrogel.

The hydrogel may be used as a transdermal delivery device for the local or systemic treatment of diseases and may be used as a matrix for micro—or nano particles containing an active pharmaceutical agent.

Examples of pharmaceutical medicaments includes a cytochine such as a growth hormone or a polypeptide growth factor such as TGF, FGF, PDGF, EGF, IGF-1, IGF-2, colony stimulating factor, transforming growth factor, nerve stimulating growth factor and the like giving rise to the incorporation of such active substances in a form being apt to local application in a wound in which the medicament may exercise its effect on the wound, other medicaments such as bacteriostatic or bactericidal compounds, e.g. iodine, iodopovidone complexes, chloramine, chlorohexidine, silver salts such as sulphadiazine, silver nitrate, silver acetate, silver lactate, silver sulphate, silver sodium thiosulphate or silver chloride, zinc or salts thereof, metronidazol, sulpha drugs, and penicillin's, tissue-healing enhancing agents, e.g. RGD tripeptides and the like, proteins, amino acids such as taurine, vitamins such ascorbic acid, enzymes for cleansing of wounds, e.g. pepsin, trypsin and the like, proteinase inhibitors or metallo-proteinase inhibitors such as Illostat or ethylene diamine tetraacetic acid, cytotoxic agents and proliferation inhibitors for use in for example surgical insertion of the product in cancer tissue and/or other therapeutic agents which optionally may be used for topical application, pain relieving agents such as lidocaine or chinchocaine, emollients, retinoids or agents having a cooling effect which is also considered an aspect of the invention.

The active ingredient may also comprise odour controlling or odour reducing material.

Materials and Methods

EXAMPLE 1

20 g of polyvinyl-pyrrolidone (PVP K90) was mixed with 4 g of polyethylene-glycol dimethacrylate 1000 (PEG-DMA 1000) and 1 g sodium peroxydisulphate in 75 g of 0.1 M citric acid/citrate buffer pH 6.0. The polymer solution was dispensed into a suitable mold in 5 mm thickness and cured under UV-light. The hydrogel was UV-cured under a single UV-lamp (specifications: 200 W/cm, microwave powered "D"-spectral type lamp with a conveyor speed of 0.4 m/min). A hydrogel sheet of 5 mm thickness was obtained.

The rheological properties of the gel was examined using dynamic oscillation rheology determining the viscoelastic moduli, G' (Elastic modulus) and G" (Loss modulus) and tan delta (G"/G') at a frequency of 1 Hz, 25° C.

The equilibrium swelling was determined by swelling the cured hydrogels in Milli-Q water for 24 hours and calculating the relative increase in uptake of water.

The viscoelastic moduli of this hydrogel was
G'=4588 Pa, G"=1110 Pa and tan delta=0.242
Equilibrium swelling=700%

Example 1 describes the preparation of a basic hydrogel of the invention. It is seen that at hydrogel containing 75% water w/w is obtained with a high elastic moduli, a lower G" which gives a tan delta value indicating a quite elastic system. Despite the high amount of water the hydrogel is still capable of absorbing water 7 times its own weight.

EXAMPLE 2

20 g of polyvinyl-pyrrolidone (PVP K90) was mixed with 4 g of polyethylene-glcyol dimethacrylate 1000 (PEG-DMA 1000) and 1 g sodium peroxydisulphate in 60 g of 0.1 M citric acid/citrate buffer pH 6.0. To this solution was added 10 ml of $5.0 \times 10^{-4}$ M FeSO.sub.4 and 5 ml of $1 \times 10^{-3}$ M ascorbic acid. The polymer solution was dispensed into a suitable mold in 5 mm thickness and cured under UV-light. The hydrogel was UV-cured under a single UV-lamp (specifications: See Example 1). A hydrogel sheet of 5 mm thickness was obtained.

Rheological characterization as in Example 1.
G'=5300 Pa, G"=1200 Pa and tan delta=0,226
Equilibrium swelling=625%

The use of a co-initiator system for a possible improvement of curing of the hydrogel was examined. As a higher elastic modulus (G'), a lower tan delta and a lower equilibrium swelling is observed, this implies a stronger and more cross-linked gel which is a result of a better curing.

EXAMPLE 3

10 g of polyvinyl-pyrrolidone K90 (PVP K90) is mixed with 10 g polyvinyl-pyrrolidone K25 (PVPK25), 4 g of polyethylene-glycol dimethacrylate 1000 (PEG-DMA 1000) and 1 g sodium peroxydisulphate in 75 g of 0.1 M citric acid/citrate buffer pH 6.0. The polymer solution was dispensed into a suitable mold in 5 mm thickness and cured under UV-light. The hydrogel was UV-cured under a single UV-lamp (specifications: See Example 1). A hydrogel sheet of 5 mm thickness was obtained.

Rheological characterization as in example 1.
G'=2400 Pa, G"=630 Pa and tan delta=0,262
Equilibrium swelling=800%

Examples 3 shows the use of shorter chained PVP in combination with the principle PVP K90 macromer. This produces a more soft gel compared to the basic hydrogel and with a higher swelling ratio. Also the tackiness of the gel is increased.

EXAMPLE 4

20 g of polyvinyl-pyrrolidone-co-vinylacetat (VA64) is mixed with 4 g of polyethylene-glycol dimethacrylate 1000

(PEG-DMA 1000) and 1 g sodium peroxydisulphate in 60 g of 0.1 M citric acid/citrate buffer pH 6.0. The polymer solution was dispensed into a suitable mold in 5 mm thickness and cured under UV-light. The hydrogel was UV-cured under a single UV-lamp (specifications: See Example 1). A hydrogel sheet of 5 mm thickness was obtained.

Rheological characterization as in Example 1.
G'=2500, G"=955 and tan delta=0,382
Equilibrium swelling=850%

Example 4 describes the use of a water-soluble copolymer of vinylpyrrolidone and vinylacetat. Softness and tackiness are increased. Swelling is increased too.

EXAMPLE 5

20 g of polyvinyl-pyrrolidone K90 (PVP K90) was mixed 4 g of polyethylene glycol dimethacrylate 1000 (PEG-DMA 1000) and 1 g sodium peroxydisulphate in 65 g of 0.1 M citric acid/citrate buffer pH 6.0. 10 g of glycerol was added to this solution. The polymer solution was dispensed into a suitable mold in 5 mm thickness and cured under UV-light. The hydrogel was UV-cured under a single UV-lamp (specifications: See Example 1). A hydrogel sheet of 5 mm thickness was obtained.

Rheological characterization as in Example 1.
G'=3640 Pa G"=1120 Pa and tan delta=0,306
Equilibrium swelling=850%

Example 5 shows the addition of a polyol. The effect of this additive is a softer feel, an increase in tack, a higher degree of swelling as compared to the basic hydrogel in Example 1. The permeability and water loss is lowered.

EXAMPLE 6

10 g of polyvinyl-pyrrolidone K90 (PVP K90) was mixed with 4 g of polyethylene glycol dimethacrylate 1000 (PEG-DMA 1000) and 1 g sodium peroxydisulphate in 60 g of 0.1 M citric acid/citrate buffer pH 6.0. To this solution was added 5 g of KCl.

The hydrogel was UV-cured under a single UV-lamp (specifications: See Example 1). A sheet hydrogel of 5 mm thickness was obtained.

Rheological characterization as in Example 1.
G'=2810 Pa, G"=1070 and tan delta=0,380
Equilibrium swelling=725%

Example 6 shows a basic hydrogel with the addition of an electrolyte to produce a conductive hydrogel for possible use in electrodes. Compared to the basic hydrogel in Example 1, the presence of 5% w/w of KCl makes the resulting gel softer and a little less elastic. However, the hydrogel has a bit more preferred tack.

EXAMPLE 7

Cytotoxicity Test

A hydrogel prepared according to example 1 was tested for cytotoxicity according to ISO standard 1993-5 described in USP 24 "elution assay".

No cell toxicity was observed.

EXAMPLE 8

Residual PEG-DMA

A hydrogel prepared according to Example 1 was tested for residual PEG-DMA (MAA). The gel was swollen in water in a vial and homogenized in this vial. The vial was centrifuged and the supernatant was analyzed for MAA via a reesterification-process and HS-GCMS. The amount of PEG-DMA is <25 ppm (5 ppm MAA-equivalents).

EXAMPLE 9

A Multilayer Hydrogel

A hydrogel was prepared according to Example 1. A polymer solution according to Example 4 was placed on the hydrogel and cured under the same standard conditions UV-light. A further layer consisting of the polymer solution described in Example 5 was then put on the top and cured creating a three-layered gel structure.

This multilayer gel having three different swelling zones may be utilized as drug delivery vehicle for the controlled release of a pharmacological active compound.

EXAMPLE 10

Hydrogel with Incorporated Support.

A hydrogel according to Example 1 was prepared incorporating a foil of an open space structure. The foil was placed directly in the polymer solution, which was then cured according to Example 1. It was possible to cure the polymer solution with net directly to obtain hydrogel with incorporated supporting foil.

Such a hydrogel system may be suitable for use in wound care, for example for burn wounds.

EXAMPLE 11

Hydrogel with a Backing Layer

A polymer solution according to Example 1 was prepared and placed on a polyurethane (PU) film. The polymer solution was cured in accordance to Example 1 and a resulting hydrogel immobilized on the PU-film was obtained, thus demonstrating that the hydrogel may be prepared and immobilized directly on a suitable surface.

EXAMPLE 12

20 g of polyvinyl-pyrrolidone K90 (PVP K90) was mixed with 5 g polyvinyl-pyrrolidone K25 (PVPK25), 2 g of polyethylene-glycol dimethacrylate 1000 (PEG-DMA 1000) and 0.2 g sodium peroxidisulphate in 75 g of 0.1 M citric acid/citrate buffer pH 6.0. The polymer solution was dispensed into a suitable mold in 5 mm thickness and precured under a single UV-lamp (specifications: See Example 1) with a conveyor speed of 0.6 m/min. A soft hydrogel sheet of 5 mm thickness was obtained. This hydrogel was post-cured and sterilized with electron beam irradiation (50 KGy).

Rheological characterization as in Example 1.
G'=3955 Pa, G"=876 Pa and tan delta=0,221
Equilibrium swelling=675%

Example 12 demonstrates a curing method in which UV-curing is used in combination with electron beam irradiation. The hydrogel is procured lightly to a soft hydrogel and then subjected to electron beam irradiation, which cure the hydrogel to its final specifications while at the same time serving as a sterilization method.

The invention claimed is:

1. A method of preparing a cross-linked hydrogel by graft polymerization, comprising the steps of:
  (1) preparing an aqueous solution having at least one saturated hydrophilic polymer component;

(2) adding a cross-linking agent at a concentration between about 1 wt % and about 30 wt %, wherein the cross-linking agent is selected from the group consisting of di- or multifunctional acrylates and methacrylates;

(3) adding a water soluble peroxydisulphate photoinitiator having a concentration of between about 0.1 wt % to 1.25 wt %;

(4) initiating the crosslinking of the polymer component in said solution by exposing the aqueous solution to ultraviolet (UV) irradiation; and wherein the curing time for the hydrogel is less than about 5 minutes.

2. The method of claim 1, wherein the aqueous solution comprises at least two saturated hydrophilic polymers.

3. The method of claim 1, wherein the water soluble peroxydisulphate is selected from the group consisting of sodium peroxydisulphate, potassium peroxydisulphate, and ammonium peroxydisulphate.

4. The method of claim 1, wherein the aqueous solution further comprises at least one co-initiator selected from the group consisting of multivalent transition metal ions.

5. The method of claim 1, wherein the hydrophilic polymer component is selected from the group consisting of polymers of cellulose derivatives, polysaccharides, polyvinyl pyrolidone, polyvinyl alcohol, polyacrylic acid, poly(methyl vinyl ether/maleic anhydride), poly(meth)acrylic acid or polyethylene glycol, copolymers thereof and blends thereof.

6. The method of claim 1, wherein the hydrophilic polymer component comprises poly-vinyl pyrrolidone or copolymers of polyvinyl pyrrolidone with cellulose derivatives, polysaccharides, polyvinyl alcohol, polyacrylic acid, poly(methyl vinyl ether/maleic anhydride), poly(meth)acrylic acid or polyethylene glycol and blends thereof with cellulose derivatives, polysaccharides, polyvinyl alcohol, polyacrylic acid, poly(methyl vinyl ether/maleic anhydride), poly(meth) acrylic acid or polyethylene glycol.

7. The method of claim 1, wherein the aqueous solution further comprises one or more plasticizers.

8. The method of claim 1, wherein the cross-linked hydrogel is in the form of a sheet.

9. A composition for the preparation of a cross-linked hydrogel by photopolymerization, the composition comprising at least one saturated hydrophilic polymer component, a cross-linking agent at a concentration between about 1 wt % and about 30 wt %, wherein the crosslinking agent is selected from the group consisting of di- and multifunctional acrylates or methacrylates, and a water soluble peroxydisulphate photoinitiator having a concentration of between about 0.1 wt % to 1.25 wt %, said composition being used in the method of claim 1.

10. The composition according to claim 9, wherein the composition comprises at least two saturated hydrophilic polymers.

11. A method of preparing a cross-linked hydrogel by graft polymerization, comprising the steps of:

(1) preparing an aqueous solution having at least one saturated hydrophilic polymer component, (2) adding a cross-linking agent at a concentration between about 1 wt % and about 30 wt %, wherein the cross-linking agent is selected from the group consisting of di- or multifunctional acrylates or methacrylates;

(3) adding a water soluble peroxydisulphate photoinitiator having a concentration of between about 0.1 wt % to 1.25 wt %;

(4) initiating the crosslinking of the polymers in said solution by exposing the aqueous solution to UV irradiation;

(5) allowing the hydrogel to cure in the form of a sheet or coating having a thickness between 10 μm to 2 cm; and wherein the curing time for the hydrogel is less than about 5 minutes.

\* \* \* \* \*